(12) United States Patent
Kim

(10) Patent No.: US 7,223,003 B2
(45) Date of Patent: May 29, 2007

(54) BACKLIGHT ASSEMBLY AND LIQUID CRYSTAL DISPLAY APPARATUS HAVING THE SAME

(75) Inventor: Yong-Il Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 175 days.

(21) Appl. No.: 10/942,344

(22) Filed: Sep. 16, 2004

(65) Prior Publication Data

US 2005/0057946 A1 Mar. 17, 2005

(30) Foreign Application Priority Data

Sep. 16, 2003 (KR) ...................... 10-2003-0063954

(51) Int. Cl.
*F21V 7/04* (2006.01)
(52) U.S. Cl. ...................... 362/561; 362/633
(58) Field of Classification Search ................ 362/561, 362/632–634
See application file for complete search history.

(56) References Cited

U.S. PATENT DOCUMENTS

| | | | | |
|---|---|---|---|---|
| 5,726,722 | A * | 3/1998 | Uehara et al. ................ | 349/66 |
| 6,392,724 | B2 * | 5/2002 | An et al. ...................... | 349/58 |
| 6,593,979 | B1 * | 7/2003 | Ha et al. ...................... | 349/58 |
| 6,667,780 | B2 * | 12/2003 | Cho .............................. | 349/58 |
| 6,814,458 | B2 * | 11/2004 | Kim et al. .................... | 362/632 |
| 6,880,947 | B2 * | 4/2005 | Hsieh et al. ................. | 362/614 |
| 6,880,953 | B2 * | 4/2005 | Shin ............................. | 362/225 |
| 6,950,154 | B2 * | 9/2005 | Lee .............................. | 349/58 |
| 7,068,332 | B2 * | 6/2006 | Liu et al. ....................... | 349/64 |
| 2004/0008512 | A1 * | 1/2004 | Kim ............................. | 362/235 |
| 2006/0072343 | A1 * | 4/2006 | Shimizu ....................... | 362/632 |

FOREIGN PATENT DOCUMENTS

JP 11084351 A * 3/1999
JP 11337942 A * 12/1999

* cited by examiner

*Primary Examiner*—Ali Alavi
*Assistant Examiner*—Hargobind S. Sawhney
(74) *Attorney, Agent, or Firm*—Cantor Colburn LLP

(57) ABSTRACT

A backlight assembly includes a lamp assembly, a bottom chassis and a heat transferring member. The lamp assembly includes the lamps and a lamp holding part holding electrodes of the lamps. The bottom chassis combined with the lamp holding part to receive the lamp assembly has a bottom plate and at least one sidewall extended from edge portion of the bottom plate. The heat transferring member is combined with the lamp holding part to fix the lamp assembly, and also combined with the bottom chassis so that heat generated from the lamp is transferred to the bottom chassis through the heat transferring member. Therefore, lamp setting process may be simplified and heat generated from the lamp may be discharged to enhance a display quality.

12 Claims, 8 Drawing Sheets

BACKLIGHT ASSEMBLY AND LIQUID CRYSTAL DISPLAY APPARATUS HAVING THE SAME

CROSS-REFERENCE TO RELATED APPLICATIONS

This application relies for priority upon Korean Patent Application No. 2003-63954 filed on Sep. 16, 2003, the contents of which are herein incorporated by reference in its entirety.

BACKGROUND OF THE INVENTION

1. Field of the Invention

The present invention relates to a backlight assembly and a liquid crystal display apparatus having the backlight assembly. More particularly, the present invention relates to a backlight assembly capable of simplifying lamp setting process and discharging heat generated from a lamp to enhance a display quality and a liquid crystal display apparatus having the same.

2. Description of the Related Art

Recently, an information process apparatus has been developed to have various shapes, functions and processing speeds. Information processed by the information process apparatus is an electric signal. Therefore, a user requires a display apparatus in order to perceive the information.

A liquid crystal display apparatus that is an example of the display apparatus displays an image by using liquid crystal. The liquid crystal display apparatus has merits such as lightweight, low power consumption and low driving voltage. Therefore, the liquid crystal display apparatus is used in various industries.

The liquid crystal display apparatus includes a liquid crystal display panel that displays an image and a backlight assembly that provides the liquid crystal display panel with a light.

The backlight assembly is classified into an edge illumination type and a direct illumination type according to a position of the lamp.

In the edge illumination type backlight assembly, a lamp is disposed at a side of a light guide plate (LGP). The edge illumination type backlight assembly is proper for a liquid crystal display apparatus with a small size. Furthermore, the edge illumination type backlight assembly reduces a thickness of a liquid crystal display apparatus.

In the direct illumination type backlight assembly, a plurality of lamps are disposed under the liquid crystal display panel in parallel with each other. The lamps provide the liquid crystal display panel directly with a light. Therefore, the direct illustrating backlight assembly is proper for a liquid crystal display apparatus that is large and requires high luminance.

However, in the direct illumination type backlight assembly, the lamps generate a large amount of heat resulting a temperature increase of a receiving container. Therefore, the liquid crystal display panel may be thermally damaged and an efficiency of the lamps may be lowered. Furthermore, a display quality is deteriorated.

SUMMARY OF THE INVENTION

The present invention provides a backlight assembly capable of simplifying lamp setting process and discharging heat generated from a lamp to enhance a display quality.

The present invention also provides a liquid crystal display apparatus having the backlight assembly. In an exemplary backlight assembly according to the present invention, a backlight assembly includes a lamp assembly, a bottom chassis and a heat transferring member. The lamp assembly has a plurality of lamps and a lamp holding part holding electrodes of the lamps. The bottom chassis has a bottom plate and sidewalls extended from edge portion of the bottom plate, and the bottom chassis is combined with the lamp holding part to receive the lamp assembly. The heat transferring member is combined with the lamp holding part to fix the lamp assembly, and also combined with the bottom chassis so that heat generated from the lamp is transferred to the bottom chassis through the heat transferring member.

In an exemplary liquid crystal display apparatus according to the present invention, a liquid crystal display apparatus includes a backlight assembly, a display unit and a top chassis. The backlight assembly includes a lamp assembly, a bottom chassis and a heat transferring member. The lamp has a plurality of lamps and a lamp holding part holding end portions of the lamps. The bottom chassis has a bottom plate and first to fourth sidewalls protruded from edge portion of the bottom plate, and the bottom chassis is combined with the lamp holding part to receive the lamp assembly. The heat transferring member is combined with the lamp holding part to fix the lamp assembly, and also combined with the bottom chassis so that heat generated from the lamp is transferred to the bottom chassis through the heat transferring member. The display unit is disposed over the backlight assembly to display an image by using a light provided from the backlight assembly. The top chassis fixes the display unit to the backlight assembly.

The backlight assembly and the liquid crystal display apparatus according to the present invention, the lamp holder that fixes an end portion of the lamp is combined directly to the bottom chassis, and the heat transferring member is combined directly to the lamp holder. Therefore, assembling process is simplified. Furthermore, cooling efficiency is enhanced.

The passage through which external air and internal air are exchanged is also formed to even more enhance the cooling efficiency.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF EMBODIMENTS

Hereinafter, the embodiments of the present invention will be described in detail with reference to the accompanied drawings.

Figure 1:
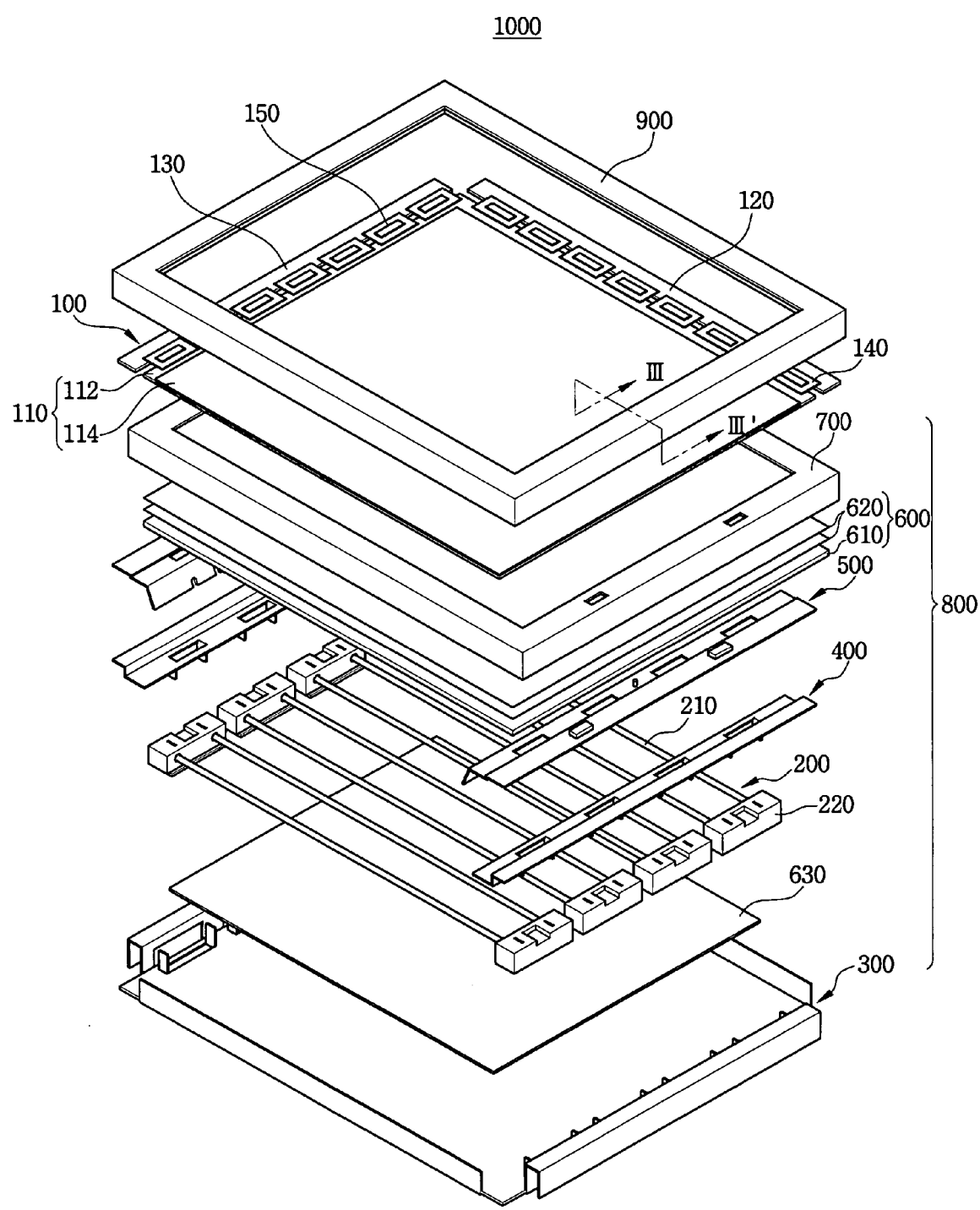
FIG. 1 is an exploded perspective view illustrating a liquid crystal display apparatus according to an exemplary embodiment of the present invention.

FIG. 1 is an exploded perspective view illustrating a liquid crystal display apparatus according to an exemplary embodiment of the present invention.

Referring to FIG. 1, a liquid crystal display apparatus 1000 according to an exemplary embodiment of the present invention includes a display unit 100 having a liquid crystal display panel 110, a backlight assembly 800 that provides the display unit 100 with a light, and a top chassis 900 that fixes the display unit 100 to the backlight assembly 800.

The display unit 100 includes a liquid crystal display panel 110 that displays an image, and a data printed circuit board (PCB) 120 and gate printed circuit board (PCB) 130 that provide the liquid crystal display panel with a driving signal. The data PCB 120 and the gate PCB 130 are electrically connected to the liquid crystal display panel 110 through a data tape carrier package (TCP) 140 and a gate tape carrier package (TCP) 150, respectively.

The liquid crystal display panel 110 includes a thin film transistor substrate 112, a color filter substrate 114 that faces the thin film transistor 112, and a liquid crystal layer interposed between the thin film transistor substrate 112 and the color filter substrate 114.

The thin film transistor substrate 112 corresponds to a glass substrate having switching devices (not shown) such as thin film transistors arranged in a matrix shape thereon. Each of the thin film transistors includes a source electrode that is electrically connected to a data line, a gate electrode that is electrically connected to a gate line, and a drain electrode that is electrically connected to a pixel electrode (not shown) including an electrically conductive and optically transparent material.

The color filter substrate 114 corresponds to a substrate having red, green and blue (RGB) color filters. The color filter substrate 114 includes a common electrode having the electrically conductive and optically transparent material.

The backlight assembly 800 that provides the display unit 100 with a light is disposed under the display unit 100.

The backlight assembly 800 includes a lamp assembly 200, a bottom chassis 300 and a heat transferring member 400. The lamp assembly 200 generates a light. The bottom chassis 300 receives the lamp assembly 200. The heat transferring member 400 discharges heat generated from the lamp assembly 200.

The lamp assembly 200 includes a plurality of lamps 210 and a lamp holder 220. Each of the lamps 210 generates a light. The lamp holder 220 holds an end portion of the lamps 210 to fix the lamps 210. In FIG. 1, two lamp holders 220 receive each end portion of one or more end portions of lamps 210, respectively. Alternatively, two lamp holders may receive each end portion of one lamp 210, respectively.

The bottom chassis 300 includes a bottom plate and four sidewalls disposed edge portion of the bottom plate to form a receiving space. Two lamp holders 220 are fixed at two sidewalls facing each other to receive each end of the lamp 210.

The heat transferring member 400 is disposed on the lamp holder 200 and combined with the lamp holder 200 to fix the lamp assembly 200. Additionally, the heat transferring member 400 is combined with the bottom chassis 300 to transfer heat generated from the lamp 210 to the bottom chassis 300. Therefore, the heat is dissipated through the bottom chassis 300.

The backlight assembly 800 further includes a first receiving container 500, optical members 600 and a second receiving container 700. The first receiving container 500 covers the lamp holder 220 and the heat transferring member 400. The optical members 600 are disposed on the first receiving container 500. The second receiving container 700 fixes the optical members 600.

The first receiving container 500 corresponds to a middle mold. The first receiving container 500 covers an upper surface and inner surface of the lamp holder 220. The first receiving container 500 supports the optical members 600.

The optical members 600 include a diffusion plate 610 and at least one optical sheet 620. The optical members 600 enhance uniformity of a light generated from the lamps 210, and a front viewing luminance. Examples of the optical sheet may be diffusion sheet that diffuses a light, prism sheet that condenses a light, etc.

The second receiving container 700 corresponds to a middle chassis. The second receiving container 700 is combined with the sidewalls of the bottom chassis 300 to fix the optical members 600 disposed on the first receiving container 500. The liquid crystal display panel 110 is disposed on the second receiving container 700.

Alternatively, the backlight assembly 800 may further include a reflection plate 630 that reflects a light generated from the lamp 210 toward the optical members 600.

Hereinafter, the backlight assembly will be explained in detail.

Figure 2:
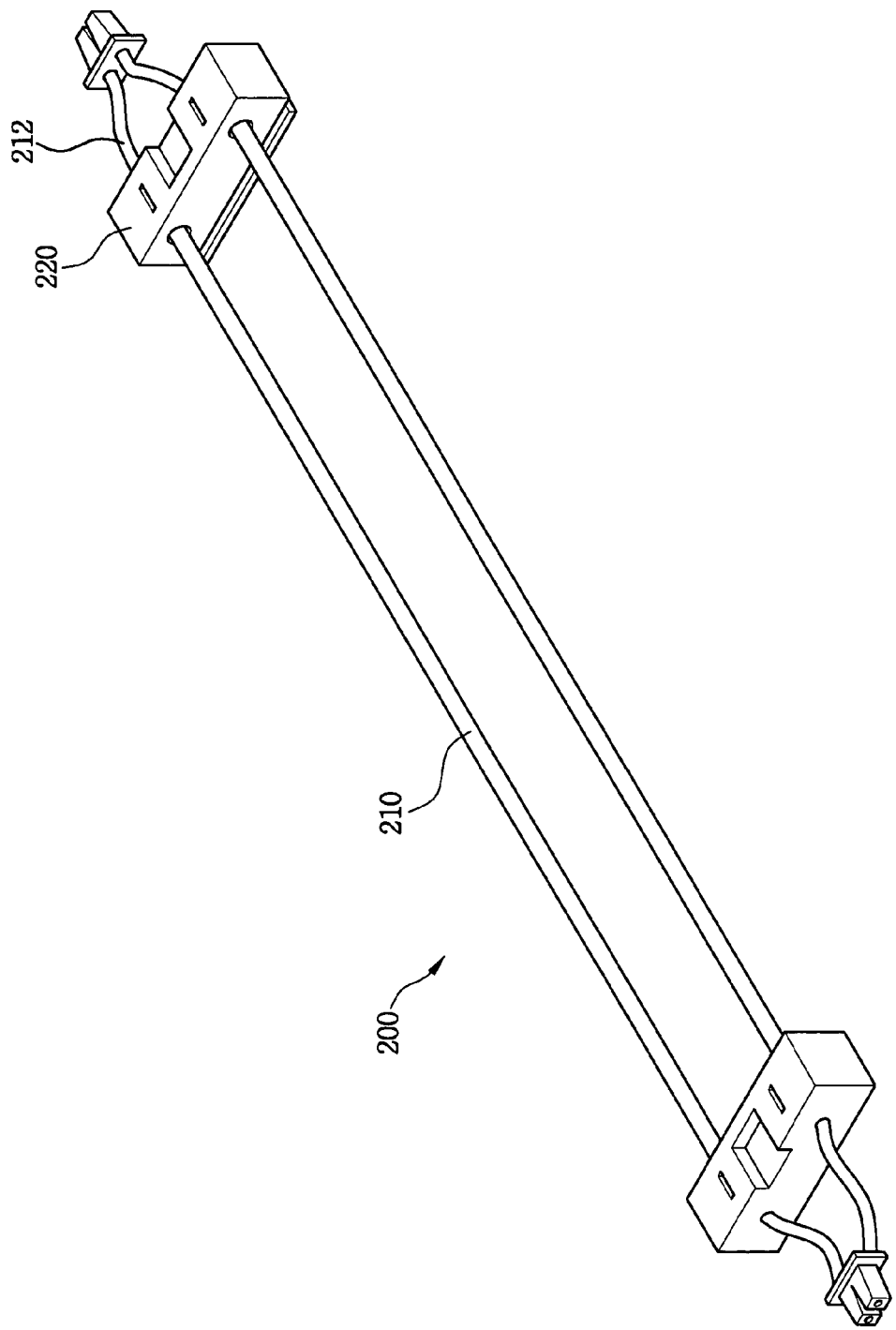
FIG. 2 is a perspective view illustrating a lamp assembly in FIG. 1.
Figure 3:
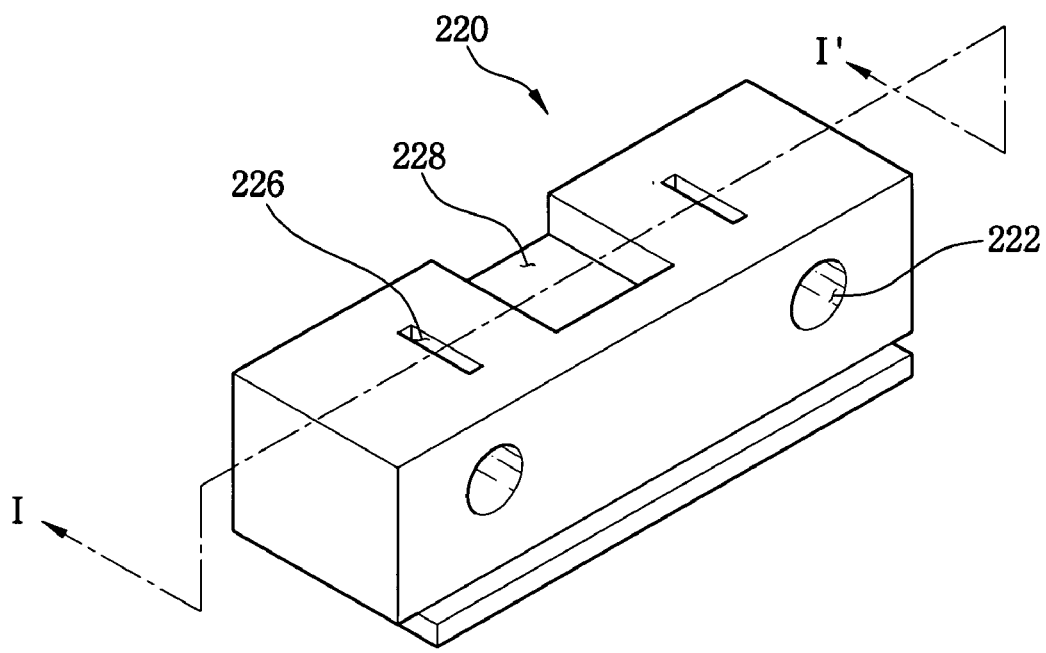
FIG. 3 is a perspective view illustrating a lamp holder in FIG. 2.
Figure 4:
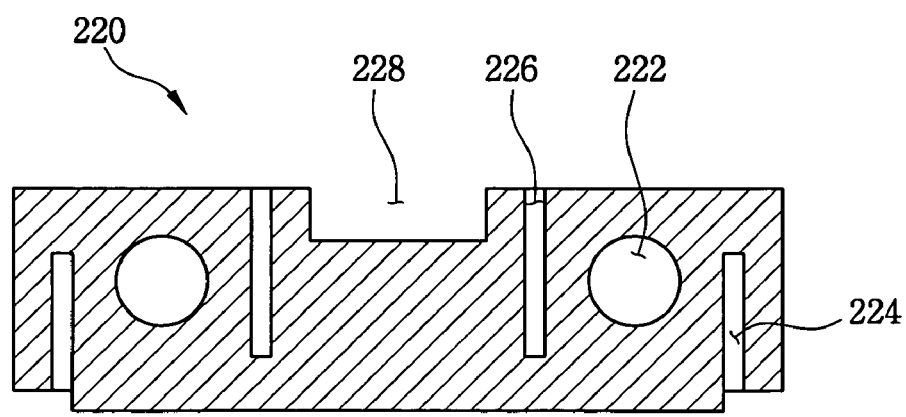
FIG. 4 is a cross-sectional view taken along a line I–I' in FIG. 4.

FIG. 2 is a perspective view illustrating a lamp assembly in FIG. 1, FIG. 3 is a perspective view illustrating a lamp holder in FIG. 2, and FIG. 4 is a cross-sectional view taken along a line I–I' in FIG. 4.

Referring to FIGS. 2 to 4, the lamp assembly 200 includes a lamp 210 that generates a light, and a lamp holder 220 that holds end portion of the lamp 210.

A cold cathode fluorescent lamp (CCFL) having a rod-shape may be employed as the lamp 210. An end portion of the lamp 210 is inserted into the lamp holder 220. A lamp wiring 212 that is electrically connected to the lamp 210 to apply driving voltage to the lamp 210 is drawn out from the lamp holder 220 through a surface that is opposite to a surface into which an end portion of the lamp 210 is inserted or a bottom surface.

The lamp holder 220 has a rectangular parallel piped shape. The lamp holder 220 may include rubber or silicone. The lamp holder 220 includes an insertion hole 222 formed at internal surface portion of the lamp holder 220. The lamp holder 220 includes as many insertion holes as the lamps 210 that are fixed by the lamp holder 220. The lamp holder 220 includes, for example, two insertion holes 222 to receive one or more end portions of lamps 210.

The lamp holder 220 further includes a first combination hole 224 combining with the bottom chassis 300. The first combination hole 224 is formed on a bottom surface portion of the lamp holder 220. The first combination hole 224 is disposed between side surface of the lamp holder 220 and the insertion hole 222.

The lamp holder 220 also includes a second combination hole 226 combining with the heat transferring member 400. The second combination hole 226 is formed on a top surface portion of the lamp holder 220. The second combination hole 226 is formed such that the insertion hole 222 is interposed between the first and second combination holes 224 and 226.

Figure 5:
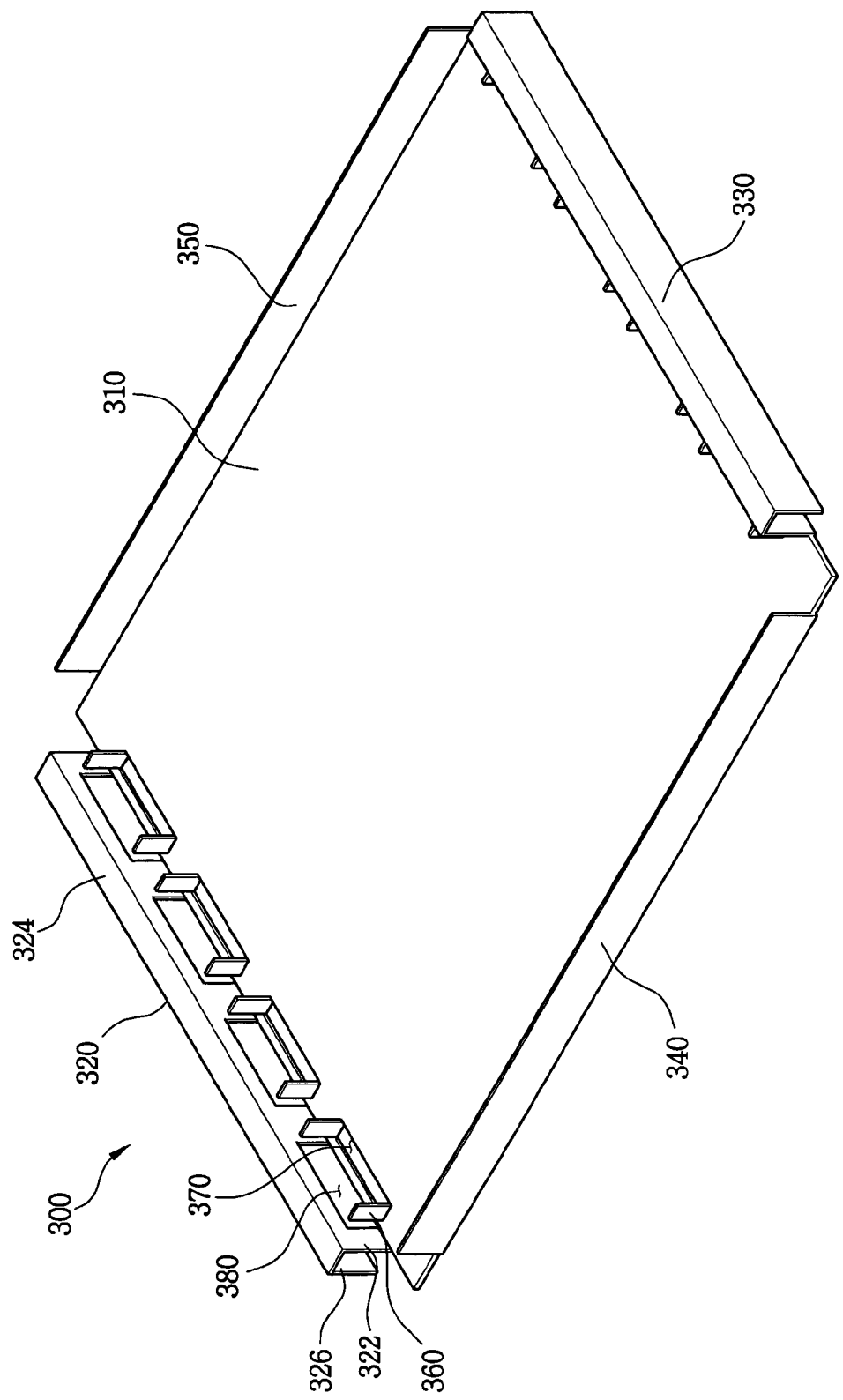
FIG. 5 is a perspective view illustrating a bottom chassis in FIG. 1.

FIG. 5 is a perspective view illustrating a bottom chassis in FIG. 1.

Referring to FIG. 5, the bottom chassis 300 includes a bottom plate 310 and first to fourth sidewalls 320, 330, 340 and 350. The first to fourth sidewalls 320, 330, 340 and 350 are disposed at edge portion of the bottom plate 310. The first and second sidewalls 320 and 330 facing each other receive the lamp holder 220.

In detail, a first protrusion 360 combining with the lamp holder 220 is protruded from the bottom plate 310. The first protrusion 360 is inserted into the first combination hole 224. The first protrusion 360 is adjacent to the first sidewall 320 or the second sidewall 330. A first opening 370 for exposing the lamp holder 220 is formed at the bottom plate.

The first and second sidewalls 320 and 330 include a first plate 322 protruded upwardly from the bottom plate 310, an top plate 324 protruded from the first plate 322 horizontally to be parallel with the bottom plate 310, and a second plate 326 protruded from the top plate 324 downwardly to be parallel with the first plate 322 in order to enhance strength of the bottom chassis 300.

The first plate 322 includes a second opening 380 that exposes the lamp holder 220. The first opening 370 may be connected the second opening 380.

Figure 6:
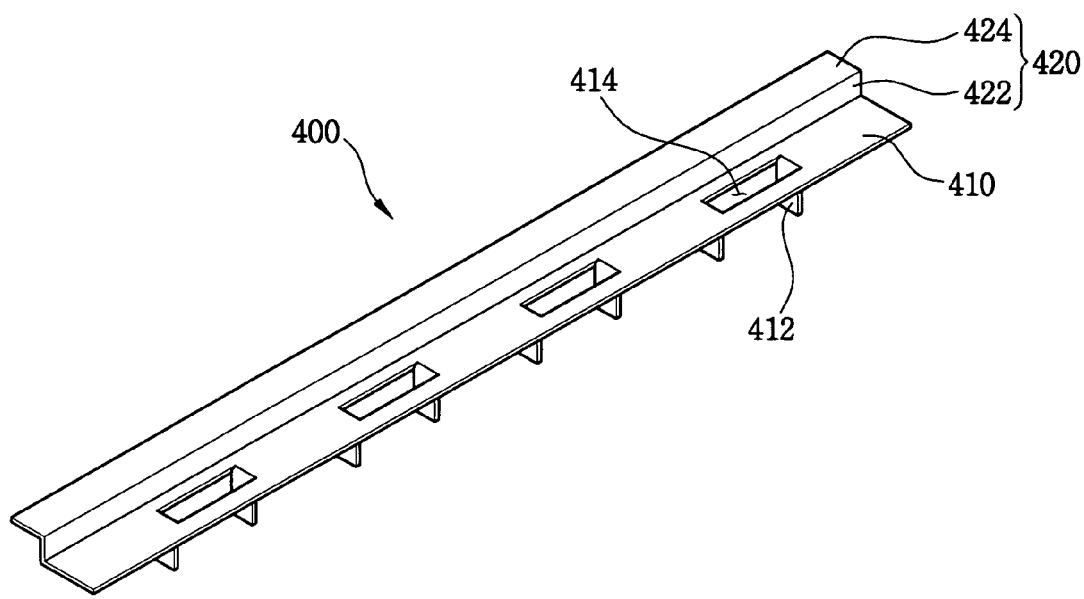
FIG. 6 is a perspective view illustrating a heat transferring member in FIG. 1.

FIG. 6 is a perspective view illustrating a heat transferring member in FIG. 1.

Referring to FIGS. 3 to 6, the heat transferring member 400 includes a first heat transferring portion 410 combining with the lamp holder 220 and a second heat transferring portion 420 combining with the bottom chassis 300.

The first heat transferring portion 410 includes a second protrusion 412 combining with the lamp holder 220. The second protrusion 412 is inserted into the second combination hole, so that the heat transferring member 400 is combined with the lamp holder 220. The first heat transferring portion 410 includes a second ventilation opening 414 for ventilating an air. The second ventilation opening 414 corresponds to a second recessed portion 228 of the lamp holder 220.

The second heat transferring portion 420 is extended from the first heat transferring portion 410. The second heat transferring portion 420 is combined with the first or second sidewall 320 or 330 of the bottom chassis 300. Particularly, the second heat transferring portion 420 includes a first heat transferring plate 422 that is extended from the first heat transferring portion 410, and a second heat transferring plate 424 that is extended from the first heat transferring plate 422. The first heat transferring plate 422 makes contact with the first plate 422 of the bottom chassis 300, and the second heat transferring plate 424 makes contact with the top plate 324 of the bottom chassis 300.

The heat transferring member 400 is combined with the bottom chassis 300 through, for example, a screw to fix the lamp holder 220. Additionally, the heat transferring member 400 transfers heat generated from the lamp 210 to the bottom chassis 300.

Figure 7:
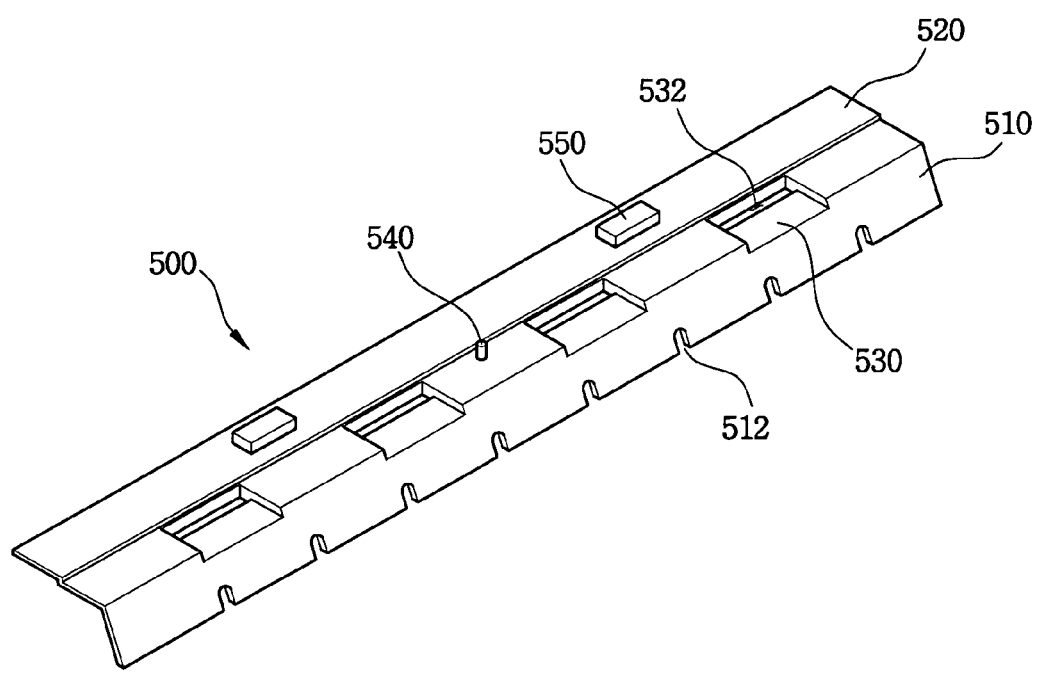
FIG. 7 is a perspective view illustrating a first receiving container in FIG. 1.
Figure 8:
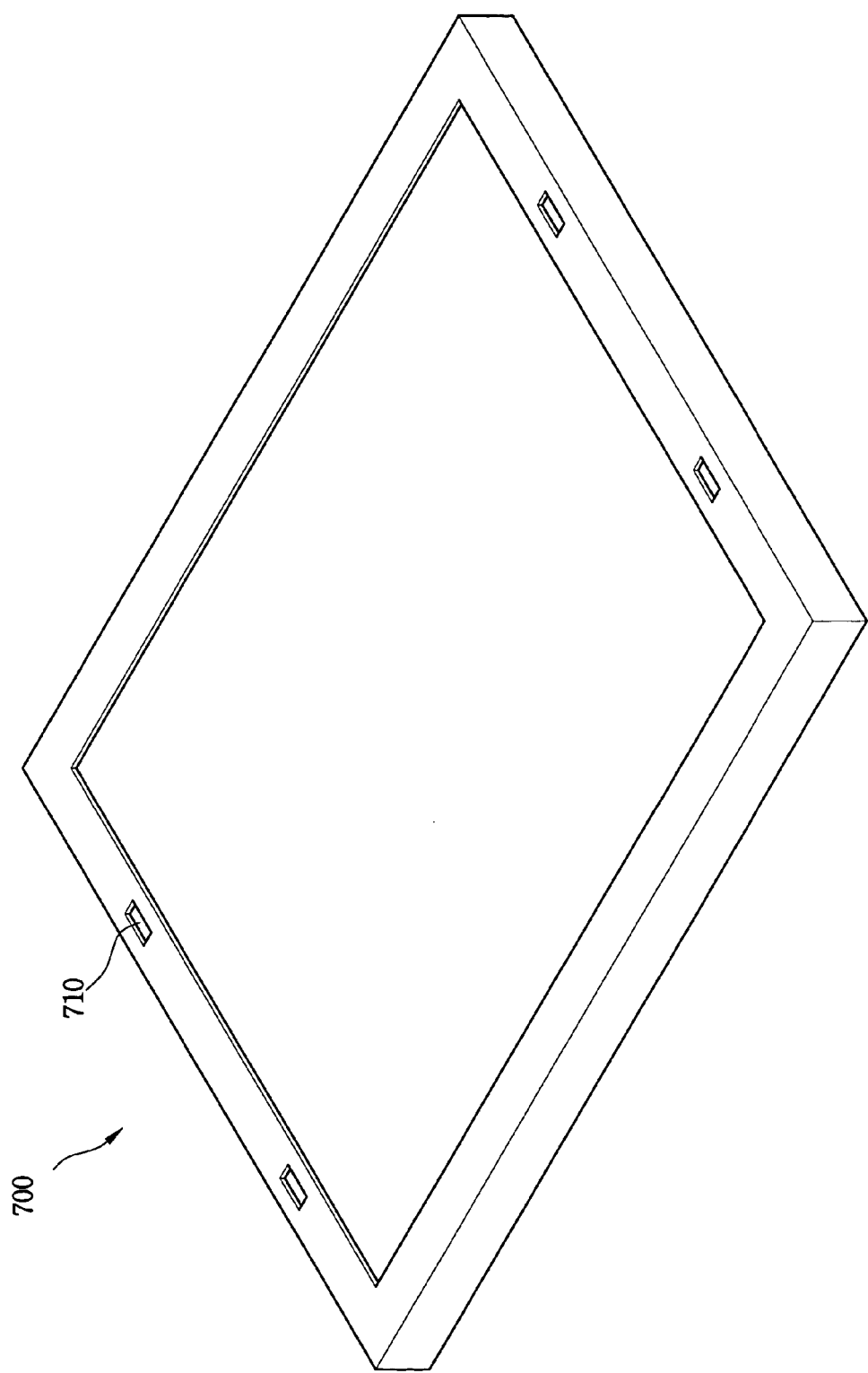
FIG. 8 is a perspective view illustrating a second receiving container in FIG. 1.

FIG. 7 is a perspective view illustrating a first receiving container in FIG. 1, and FIG. 8 is a perspective view illustrating a second receiving container in FIG. 1.

Referring to FIGS. 7 and 8, the first receiving container 500 includes a first cover 510 that covers an internal surface of the lamp holder 220, and a second cover 520 that covers an upper surface of the lamp holder 220.

The first cover 510 divides the lamp 210 into an emitting region and a non-emitting region. The first cover 510 includes a receiving groove 512 into which the lamp 210 is inserted.

The second cover 520 is disposed over the top plate 324 of the bottom chassis 300 with the second heat transferring plate 424 of the heat transferring member 400 interposed therebetween. The second cover 520 includes a first recessed portion 530 for an airflow. The first recessed portion 530 disposed between the lamps 210 is recessed from the second cover 520.

That is, the first recessed portion 530 corresponds to the second recessed portion 414 of the heat transferring member 400. The first recessed portion 530 is extended from the first cover 510, and a first ventilation opening 532 is formed at the end portion of the first recessed portion 530.

The second cover 520 supports the optical members 600. That is, the optical members 600 are disposed over the second cover 520. In order to prevent the optical members 600 from floating, the second cover 520 includes a first boss 540. The second cover 520 also includes a second boss 550 that guides the second receiving container 700 for fixing the optical members 600 and supports the top chassis 900.

The second receiving container 700 compresses edge portion of the optical members 600 to fix the optical members 600. The second receiving container 700 may further include a stepped portion formed on an upper surface portion of the second receiving container 700. The stepped portion guides the liquid crystal display panel 110. The second receiving container 700 includes an opening 710, so that the second boss 550 of the first receiving container 500 is inserted into the opening 710 to combine the second receiving container 700 to the first receiving container 500.

Figure 9:
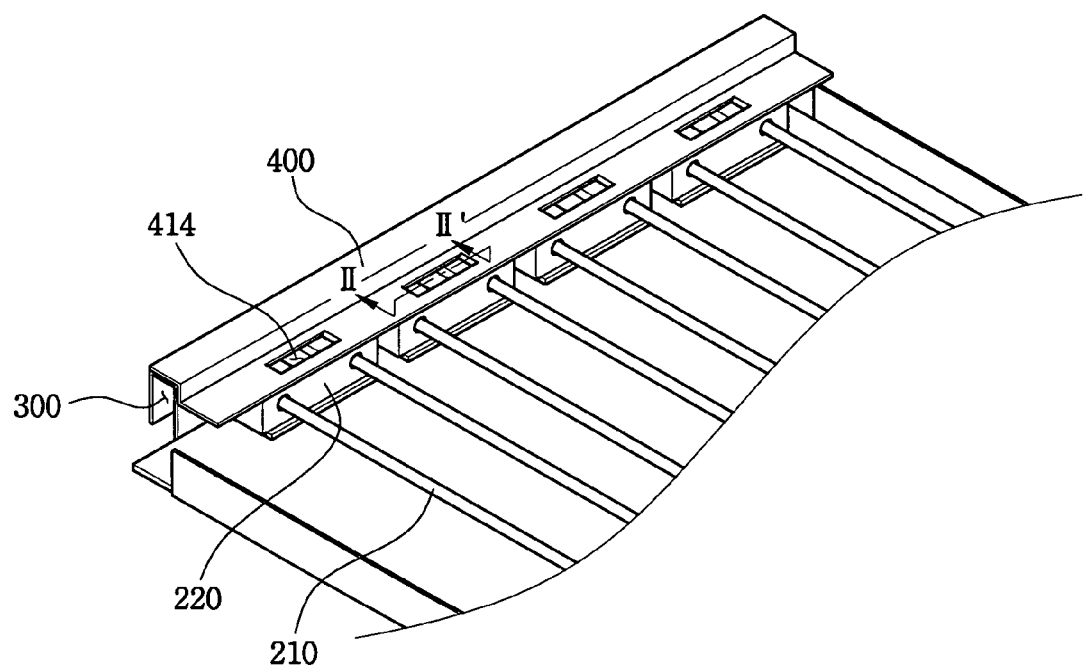
FIG. 9 is a perspective view illustrating a bottom chassis having lamp holder and heat transferring member attached thereto in FIG. 1.
Figure 10:
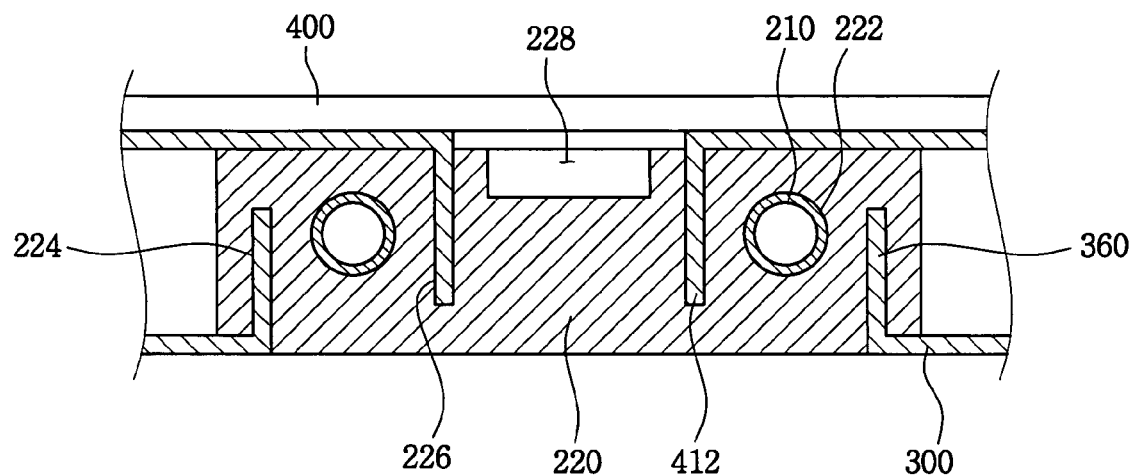
FIG. 10 is a cross-sectional view taken along a line II–II' in FIG. 9.

FIG. 9 is a perspective view illustrating a bottom chassis having lamp holder and heat transferring member attached thereto in FIG. 1, and FIG. 10 is a cross-sectional view taken along a line II–II' in FIG. 9.

Referring to FIGS. 9 and 10, the bottom chassis 300 receives a plurality of the lamp assemblies 200. Each of the lamp assemblies 200 receives one or more end portions of lamps 210. The first protrusion 360 of the bottom chassis 300 is inserted into the first combination hole 224 of the lamp holder 220, so that the lamp holder 220 is combined with the bottom chassis 300.

The heat transferring member 400 for dissipating heat generated from the lamp 210 is disposed on the lamp holder 220 that is fixed to the bottom chassis 300. The second protrusion 412 of the heat transferring member 400 is inserted into the second combination 226 of the lamp holder 220, so that the heat transferring member 400 is fixed to the heat transferring member 400.

The first and second heat transferring plates 422 and 424 of the heat transferring member 400 make contact with the bottom chassis 300, so that heat generated from the bottom chassis 300 is transferred to bottom chassis 300 through the heat transferring member 400. Furthermore, the bottom plate and sidewalls of the bottom chassis 300 include first and second openings 370 and 380, respectively, so that heat generated from the lamp 210 may be directly discharged therethrough.

The third and fourth sidewalls 340 and 350 that are perpendicular to the first and second sidewalls 320 and 330 may have a same height as that of the first receiving container 500. The third and fourth sidewalls 340 and 350 may include a supporting member (not shown) that supports the optical members 600.

The backlight assembly according to the present embodiment dissipates heat based on heat emission by the heat transferring member and convective heat transfer through the first and second openings 370 and 380. Therefore, temperature of the backlight assembly may be easily lowered.

Figure 11:
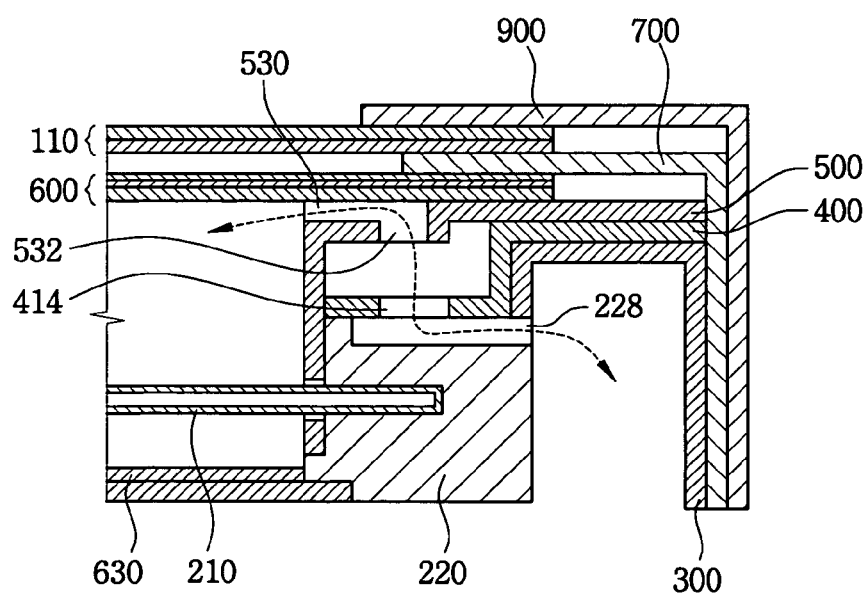
FIG. 11 is a cross-sectional view taken along a line III–III' in FIG. 1.

FIG. 11 is a cross-sectional view taken along a line III–III' in FIG. 1. FIG. 11 shows an air pathway.

Referring to FIG. 11, the backlight assembly 800 includes an air pathway, so that heat generated from the lamp 210 may be discharged.

An air inside the backlight assembly 800 is heated by the lamp 210. The heated air flows through the first recessed portion 530 and the first ventilation opening 532 toward the lamp holder 220. Then, the heated air flows through the second ventilation opening 414 formed at the heat transferring member 400 and the second heat recessed portion 228 of the lamp holder 220 to outside of the backlight assembly 800.

External air may flow into the backlight assembly through a reverse path from a path described above.

As described above, the backlight assembly 800 includes a passage for air. Therefore, a temperature inside the backlight assembly 800 may be lowered.

The air passage is formed, for example, at left and right sides of the liquid crystal display apparatus 1000 in FIGS. 1 to 11. Alternatively, the air passage may be formed at upper and lower sides of the liquid crystal display apparatus 1000.

When the air passage is formed at the upper and lower sides of the liquid crystal display apparatus 1000, heated air is exhausted through the upper side and cooled air is injected into the backlight assembly through the lower side. Therefore, cooling efficiency is enhanced.

The backlight assembly and the liquid crystal display apparatus according to the present invention, the lamp holder that fixes an end portion of the lamp is combined directly to the bottom chassis, and the heat transferring member is combined directly to the lamp holder. Therefore, assembling process is simplified. Furthermore, cooling efficiency is enhanced.

The passage through which external air and internal air are exchanged is also formed to even more enhance the cooling efficiency.

Having described the exemplary embodiments of the present invention and its advantages, it is noted that various changes, substitutions and alterations can be made herein without departing from the spirit and scope of the invention as defined by appended claims.

What is claimed is:

1. A liquid crystal display apparatus comprising:
    a backlight assembly including:
        a lamp assembly including a plurality of lamps and a plurality of lamp holders combined with electrodes of the lamps;
        a bottom chassis combined with the lamp holder to receive the lamp assembly;
        a first receiving container that covers the lamp holder and is combined with the bottom chassis; and
        a heat transferring member combined with the lamp holder to fix the lamp assembly, the heat transferring member being combined also with the bottom chassis, so that heat generated from the lamp is transferred to the bottom chassis through the heat transferring member, the heat transferring member being between the first receiving member and the lamp assembly;
    a display unit disposed over the backlight assembly to display an image by using a light provided from the backlight assembly; and
    a top chassis that fixes the display unit to the backlight assembly.

2. The liquid crystal display apparatus of claim 1, wherein the display unit comprises:
    a liquid crystal display panel including an upper substrate, a lower substrate facing the upper substrate and a liquid crystal layer interposed between the upper and lower substrates; and
    a printed circuit board that provides the liquid crystal display panel with a driving signal to drive the liquid crystal display panel.

3. The liquid crystal display apparatus of claim 2, wherein the lamp holder comprises:
    a first combination hole combining with the bottom chassis; and
    a second combination hole combining with the heat transferring member.

4. The liquid crystal display apparatus of claim 3, wherein the bottom chassis comprises a bottom plate, a sidewall extended from the bottom plate and a first protrusion that is inserted into the first combination hole.

5. The liquid crystal display apparatus of claim 4, wherein the heat transferring member comprises:
    a first heat transferring portion including a second protrusion inserted into the second combination hole; and
    a second heat transferring portion extended from the first heat transferring portion to make contact with the sidewall that is disposed adjacent to the lamp holder.

6. The liquid crystal display apparatus of claim 1, wherein the backlight assembly comprises:
    an optical member that is disposed on the first receiving container; and
    a second receiving container that fixes the optical member and guides the display unit.

7. The liquid crystal display apparatus of claim 6, wherein the first receiving container further comprises a first recessed portion for ventilating an air.

8. The liquid crystal display apparatus of claim 7, wherein the lamp holder further comprises a second recessed portion corresponding to the first recessed portion.

9. The liquid crystal display apparatus of claim 6, wherein the first receiving container comprises:
    a first boss that prevents floating of the optical member; and
    a second boss that supports the top chassis.

10. The liquid crystal display apparatus of claim 9, wherein the second receiving container further comprises an opening into which the second boss of the first receiving container is inserted.

11. The liquid crystal display apparatus of claim 1, wherein number of the lamp and number of the lamp holder are plural, and each lamp holder holds one or more electrodes of lamps.

12. The liquid crystal display apparatus of claim 11, wherein the bottom chassis comprises a bottom plate and a sidewall extended from the bottom plate, wherein the bottom plate includes a first opening under the lamp holder and the sidewall includes a second opening that is adjacent to the lamp holder.

* * * * *